H. LUXEMBOURGER, Jr.
SHOCK ABSORBER.
APPLICATION FILED APR. 18, 1910.

1,017,435.

Patented Feb. 13, 1912.

Witnesses.

Inventor:
Henry Luxembourger Jr.
By
Attys

UNITED STATES PATENT OFFICE.

HENRY LUXEMBOURGER, JR., OF LOS ANGELES, CALIFORNIA.

SHOCK-ABSORBER.

1,017,435.  Specification of Letters Patent. Patented Feb. 13, 1912.

Application filed April 18, 1910. Serial No. 556,029.

*To all whom it may concern:*

Be it known that I, HENRY LUXEMBOURGER, Jr., a citizen of the United States, residing at Los Angeles, in the county of Los Angeles and State of California, have invented new and useful Improvements in Shock-Absorbers, of which the following is a specification.

This invention relates to shock absorbers such as are attached between the axles and the bodies of vehicles in order to ease the action of the springs.

The object of the invention is to produce a shock absorber which will give a very resilient effect in operation and prevent undue distortion of the springs.

Figure 1:
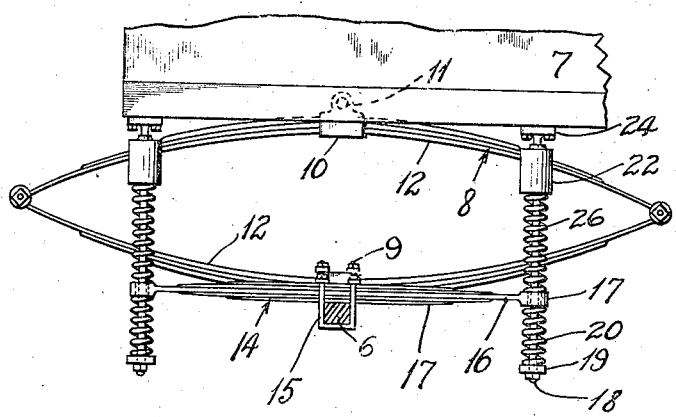
Figure 2:
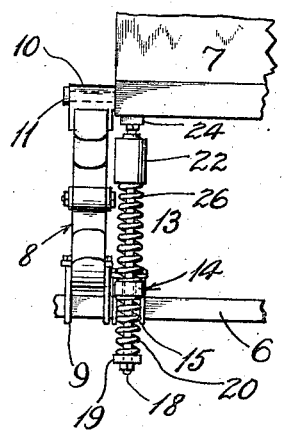
Figure 3:
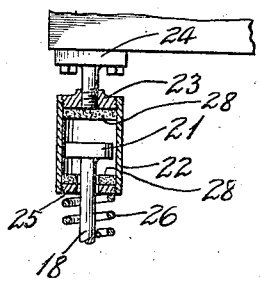

In the annexed drawing which forms a part of this specification, Figure 1 is a side elevation of the shock absorber and showing a portion of the vehicle body; the axle being shown in cross section. Fig. 2 is a front elevation of the shock absorber, portions of the vehicle body and the axle being shown broken away. Fig. 3 is a vertical section taken through a guide which constitutes a feature of the shock absorber.

Referring more particularly to the parts and especially to Figs. 1 and 3, 6 represents the axle, above which a vehicle body 7 is supported on a carriage spring 8 secured to the axle by a suitable clip 9 and secured to the outer side of the body by a shoe 10 attached on the pivot bolt 11. This carriage spring 8 is of a common form consisting of two bows 12 having their concave sides toward each other and connected together at their ends, the said bows being composed of a plurality of leaves.

As shown in Fig. 2, spring 8 is disposed beyond the vertical plane of the side of the body. Under the edge of the body my shock absorber 13 is placed. This shock absorber comprises a cross head 14 which is attached to the upper side of the axle 6 by suitable clip 15. This cross head 14 is formed of a central bar 16 and a plurality of resilient leaves 17 which extend longitudinally of the bar and reinforces it at its middle. At the ends of the bar 16 heads 17 are formed and through these heads stems 18 pass loosely, and the lower ends of the stems 18 are provided with collars 19; these collars form the seats for under-springs 20. The upper ends of the stems 18 are formed into enlargements or heads 21 which are received in guide cylinders 22, the heads 23 of the said guide being attached by brackets 24 to the under side of the body as indicated. Between the bottom heads 25 of the cylinders and the heads 17 over-springs 26 are provided which are disposed around the stems as shown. Adjacent to the heads 23 and 25 buffers or pads 28 are provided in the cylinders as indicated in Fig. 3 and these pads are adapted to cushion the blow if the piston head 21 should strike the ends of the cylinder.

In the mode of operation of this device, a downward movement of the body toward the axle will be resisted by the over-springs 26 and they tend to prevent undue distortion of the springs 8, likewise an upward movement of the body with respect to the axle will be resisted by the springs 20. In this way springs 20 and 26 tend to hold the body in the position shown and absorb the shock in passing over ruts and unevennesses in the road-way. The resilience of the cross head 14 tends to prevent this downward or upward movement of the body and assists in restoring the body to its normal position.

Having described my invention what I claim as new and desire to secure by Letters Patent is:

1. In combination, a vehicle having a body, an axle, a carriage spring supporting said body on said axle, a resilient cross-head attached to said axle, stems coöperating with said cross-head, springs disposed around said stems seating against said cross-head, and means for guiding said stems on said body.

2. In combination, a vehicle having a body, an axle, a carriage spring supporting said body above said axle, a cross-head attached to said axle, stems passing through the ends of said cross-head, said stems having pistons on the upper ends thereof, cylinders secured to said body to guide said pistons, springs disposed around said stems and between said cylinders and said cross-head, and springs disposed around said stems below said cross-heads, said last named springs being arranged to resist an upward movement of said stems.

3. In combination, a vehicle having a body, an axle, a spring disposed between said body and said axle, a resilient cross head attached to said axle, stems having pistons on the upper ends thereof coöperating with said cross head, cylinders disposed in operative relation to said cross heads to guide said pistons, and springs disposed around said stems seating against said cross head.

In witness that I claim the foregoing I have hereunto subscribed my name this 9th day of April, 1910.

HENRY LUXEMBOURGER, Jr.

Witnesses:
F. D. America,
Ethel Coleman.